(12) United States Patent
Chou et al.

(10) Patent No.: US 9,141,807 B2
(45) Date of Patent: Sep. 22, 2015

(54) SECURITY REMEDIATION

(71) Applicant: Synopsys, Inc., Mountain View, CA (US)

(72) Inventors: Andy C Chou, San Francisco, CA (US); Jon Passki, Brooklyn, NY (US); Romain Gaucher, San Francisco, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/842,176

(22) Filed: Mar. 15, 2013

(65) Prior Publication Data

US 2014/0096257 A1    Apr. 3, 2014

Related U.S. Application Data

(60) Provisional application No. 61/706,823, filed on Sep. 28, 2012.

(51) Int. Cl.
*G06F 21/57*    (2013.01)

(52) U.S. Cl.
CPC .................................. *G06F 21/577* (2013.01)

(58) Field of Classification Search
CPC ...................................................... G06F 21/577
USPC .......................................................... 726/25
See application file for complete search history.

(56) References Cited

U.S. PATENT DOCUMENTS

| | | | | |
|---|---|---|---|---|
| 7,475,419 | B1 * | 1/2009 | Basu et al. ......................... | 726/2 |
| 2002/0078406 | A1 * | 6/2002 | Kondoh et al. .................. | 714/48 |
| 2005/0108554 | A1 * | 5/2005 | Rubin et al. ................... | 713/187 |
| 2005/0108562 | A1 * | 5/2005 | Khazan et al. ................. | 713/200 |
| 2006/0005122 | A1 * | 1/2006 | Lemoine ......................... | 715/513 |
| 2006/0117307 | A1 * | 6/2006 | Averbuch et al. .............. | 717/143 |
| 2007/0112969 | A1 * | 5/2007 | Wang et al. .................... | 709/230 |

(Continued)

FOREIGN PATENT DOCUMENTS

| | | | |
|---|---|---|---|
| WO | WO-2014052661 | A2 | 4/2014 |
| WO | WO-2014052661 | A3 | 4/2014 |

OTHER PUBLICATIONS

"International Application Serial No. PCT/US2013/062028, International Search Report mailed Apr. 15, 2014", 2 pgs.

(Continued)

*Primary Examiner* — Joseph P Hirl
*Assistant Examiner* — J. Brant Murphy
(74) *Attorney, Agent, or Firm* — Schwegman Lundberg & Woessner, P.A.

(57) ABSTRACT

A method is provided to remediate defects in first computer program code that can be used to configure a computer to produce code for use by the same or a different computer configured using second computer program code to use the produced code to produce output information, the method comprising: configuring a computer to perform static analysis of the first program to produce an information structure in a non-transitory computer readable storage device that associates a respective code statement of the first program code with a respective context, wherein the context associates a parser state with a potential defect in the produced code; identify a defect in the first computer program code that is associated with the respective code statement; and determining a remediation for the identified defect.

25 Claims, 16 Drawing Sheets

(56) References Cited

U.S. PATENT DOCUMENTS

| | | |
|---|---|---|
| 2007/0162445 A1* | 7/2007 | Scriffignano et al. ............ 707/6 |
| 2010/0313073 A1* | 12/2010 | Leeb et al. ...................... 714/37 |
| 2011/0030057 A1* | 2/2011 | Chen et al. ..................... 726/23 |
| 2011/0271258 A1* | 11/2011 | Park et al. ..................... 717/127 |
| 2012/0017280 A1* | 1/2012 | Wiegenstein et al. .......... 726/25 |
| 2012/0151266 A1* | 6/2012 | Reed et al. ..................... 714/37 |
| 2012/0222021 A1* | 8/2012 | Zhao ............................ 717/143 |
| 2012/0246620 A1* | 9/2012 | Bellucci et al. ............... 717/124 |
| 2013/0055223 A1* | 2/2013 | Xu ................................ 717/143 |
| 2013/0205398 A1* | 8/2013 | Kalman et al. ................. 726/25 |
| 2014/0020046 A1* | 1/2014 | Heitzman ........................ 726/1 |
| 2014/0096257 A1* | 4/2014 | Chou et al. ..................... 726/25 |

OTHER PUBLICATIONS

"International Application Serial No. PCT/US2013/062028, Written Opinion mailed Apr. 15, 2014", 10 pgs.

Di Lucca, G. A, et al., "Identifying cross site scripting vulnerabilities in Web applications", Sixth IEEE International Workshop on Web Site Evolution, 2004. WSE 2004. Proceedings., (2004), 71-80.

"International Application Serial No. PCT/US2013/062028, International Preliminary Report on Patentability mailed Apr. 9, 2015", 12 pgs.

* cited by examiner

REMEDIATION OBLIGATION DATA STRUCTURE:

| DEFECT TYPE |
| --- |
| CODE STATEMENT |
| CONTEXT |
| TECHNOLOGY |
| EXISTING REMEDIATION |

| DEFECT TYPE: | CROSS-SITE SCRIPTING |
| --- | --- |
| CODE STATEMENT: | 404 |
| CONTEXT: | 'hi' JS_STRING |
| TECHNOLOGY: | JSP_SCRIPLET |
| EXISTING REMEDIATION: | |

| DEFECT TYPE: | TAINTED DATA |
| --- | --- |
| CODE STATEMENT: | 404 |
| CONTEXT: | '"Var=hi"' HTML_ATT_DQ |
| TECHNOLOGY: | JAVA |
| EXISTING REMEDIATION: | |

*Fig. 16*

SECURITY REMEDIATION

CROSS REFERENCE TO RELATED APPLICATIONS

This application claims priority to U.S. provisional patent application Ser. No. 61/706,823 entitled Security Remediation, filed Sep. 28, 2012, which is incorporated in its entirety herein by this reference.

BACKGROUND

A computer program such as a browser, for example, configures a computer to generate user interface information based at least in part upon code such as HTML, CSS and javascript downloaded from another computer such as a web server, for example. Defects and/or vulnerabilities in the downloaded code can be harmful to the operation of a computer configured to use such code, such as a computer configured to implement a browser, for example. Defects in a program running on a web server, for example, that produces the downloaded code can result in the defects or vulnerabilities in the downloaded code that put at risk a computer configured to use such code.

SUMMARY

In one aspect, a method to remediate a defect in first computer program code that can be used to configure a computer to produce code for use by the same or a different computer configured using second computer program code to use the produced code to produce output information. A computer is configured to perform static analysis of the first program. The static analysis produces results that associate a respective code statement of the first program code with a respective context. The respective context associates a parser state associated with the produced code with a potential defect type in the produced code. The static analysis also produces results that identify a defect type in the first computer program code that is associated with the respective code statement. A determination is made of a remediation for the identified defect to be applied to the first computer program code based upon at least the identified defect type, the context associated with the respective code statement and a technology used by the first computer program code to produce the respective code statement.

BRIEF DESCRIPTION OF THE DRAWINGS

FIG. 9 is an illustrative drawing representing a remediation obligation data structure produced according to the process of FIG. 8 in accordance with some embodiments.

FIG. 15 is an illustrative drawing representing a remediation obligation data structure produced for the first context shown in FIG. 14 in accordance with some embodiments.

FIG. 16 is an illustrative drawing representing a remediation obligation data structure 1602 produced for the second context 304 shown in FIG. 14 in accordance with some embodiments.

DESCRIPTION OF EMBODIMENTS

Figure 1:
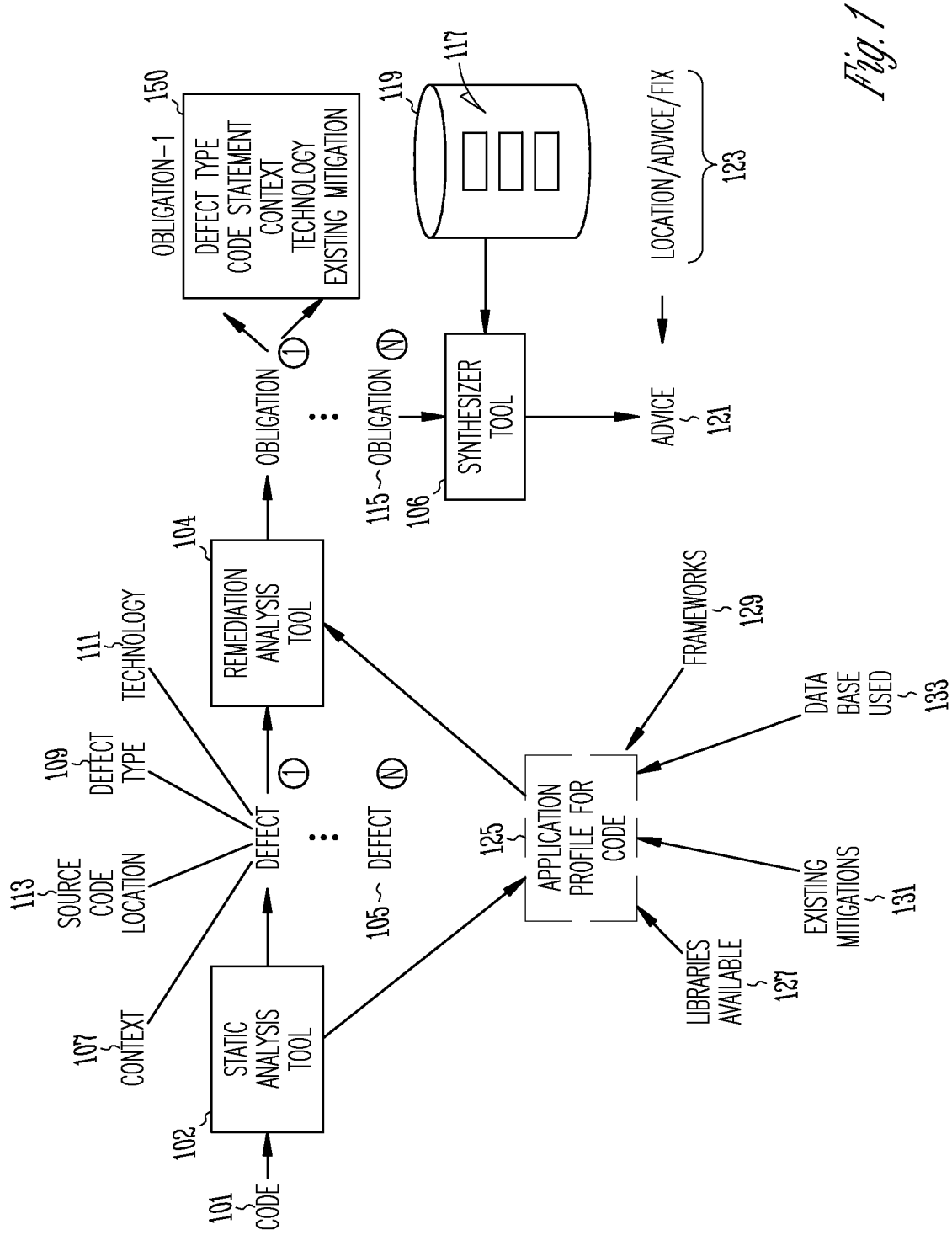
FIG. 1 is an illustrative flow diagram representing a process to remediate defects in accordance with some embodiments.

The following description is presented to enable any person skilled in the art to create and use a computer system configuration and related method and article of manufacture to configure a computer to identify a remediation of one or more defects in a first computer program that configures a first computer to produce code for consumption by a second computer configured using a second computer program to generate output information based upon the produced code. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Overview of Security Remediation

FIG. 1 is an illustrative flow diagram representing a process to remediate defects in accordance with some embodiments. Code of a first application (a first computer program) 101 that is to be evaluated is provided to a static analysis tool 102, which identifies defects (defect-1, . . . , defect-n) 105. The first application configures a computer to produce code (not shown) for use by the same or a different computer configured using second computer program code (not shown) to use the produced code to produce output information. For each defect, a context 107, a defect type 109, a technology 111 and a source code location 113 are identified using a static analysis tool. As used herein, the defect type identified by the static analysis tool refers to a defect in the first computer program. As used herein, the technology identified by the static analysis tool corresponds to the technology used by a developer to create the first computer program. As used herein, a context corresponds to one or more parser states of a parser used to parse the second computer program that may correspond to a defect. Thus, one context may correspond to multiple parser states; in some embodiments, parser states are grouped by contexts. It will be noted that the term defect as used herein is not intended to encompass vulnerability such as a security vulnerability. The context identified by the static analysis tool corresponds to a parser state that would be used by the same or a different computer configured using a second computer program code in parsing the produced code to produce the output information.

A remediation tool 104 determines security/safety obligations 115 as a function of context 107, a defect type 109, and technology 111. In some embodiments, each individual obligation 115, such as obligation-1 150, indicates defect type, code statement location, context, technology and existing mitigation. A synthesizer tool 106 determines as a function of each obligation (obligation-1, . . . , obligation-n) 115, one or more remediation fragments 117 stored in a remediation database 119 and assembles the determined fragments into remediation advice 121. The advice 121 includes information 123 that includes source code location in the code where the advice would be associated, the advice (e.g., a textual message), and possibly, code fixes.

An application profile 125 includes information stored in a database, for example, that indicates characteristics of the first application 101 that is useful in customizing the remediation advice 121 later. For example, in some embodiments the application profile 125 includes information such as which libraries 127 the application 101 uses, which frameworks 129 it uses, which database 133 it uses and which existing mitigations 131 it already uses. The application profile 125 provides information that is useful to ensure that remediation guidance that is consistent with existing practices in the application. In some embodiments, application profile information is gathered through static analysis, which garners information about an application in the course of running static analysis checks on the source code of the application.

A list of available libraries 127 that are available at runtime in effect defines a set of functions that can be used to mitigate the defect. In general, if a certain function already is being used to remediate a defect, then the remediation advice would be aligned with that function rather than suggest some other function that a developer of the application code might be unfamiliar with. As used herein, the term 'function', also referred to as a subroutine, procedure or method, means a portion of a program that performs a specific task that is relatively independent of other code within the program and that typically is written so that it can be invoked at several different places within the program including from within other functions. For example, if an application already uses a certain function to escape tainted data in a particular way, then the remediation advice would be aligned with that approach when applied to a specific defect where the escaping function is a correct remediation for that defect.

Application frameworks 129 often include mitigations for defects that can be easily used by developers. By knowing about the use of a particular framework 129 the remediation advice 121 can specify a framework-specific remediation. As used herein, the term 'framework' means a software platform used to develop applications; a framework may include one or more of support programs, compilers, code libraries, an application programming interface (API) and tool sets that bring together different components to facilitate development of an application.

A record of existing mitigations 131 includes mitigations already applied in the code for a potential defect that has been discovered. A defect that occurs in spite of an existing mitigation is a defect for which the existing mitigation is insufficient to meet the safety or security obligation. In that case, the existing mitigation is either not the correct mitigation or not complete enough to fix the defect. It may be useful to know of an existing albeit inadequate mitigations because a recommended remediation may involve removing the existing mitigation and/or adding another mitigation.

Example

Security Remediation in a Web Application/Browser

Figure 2:
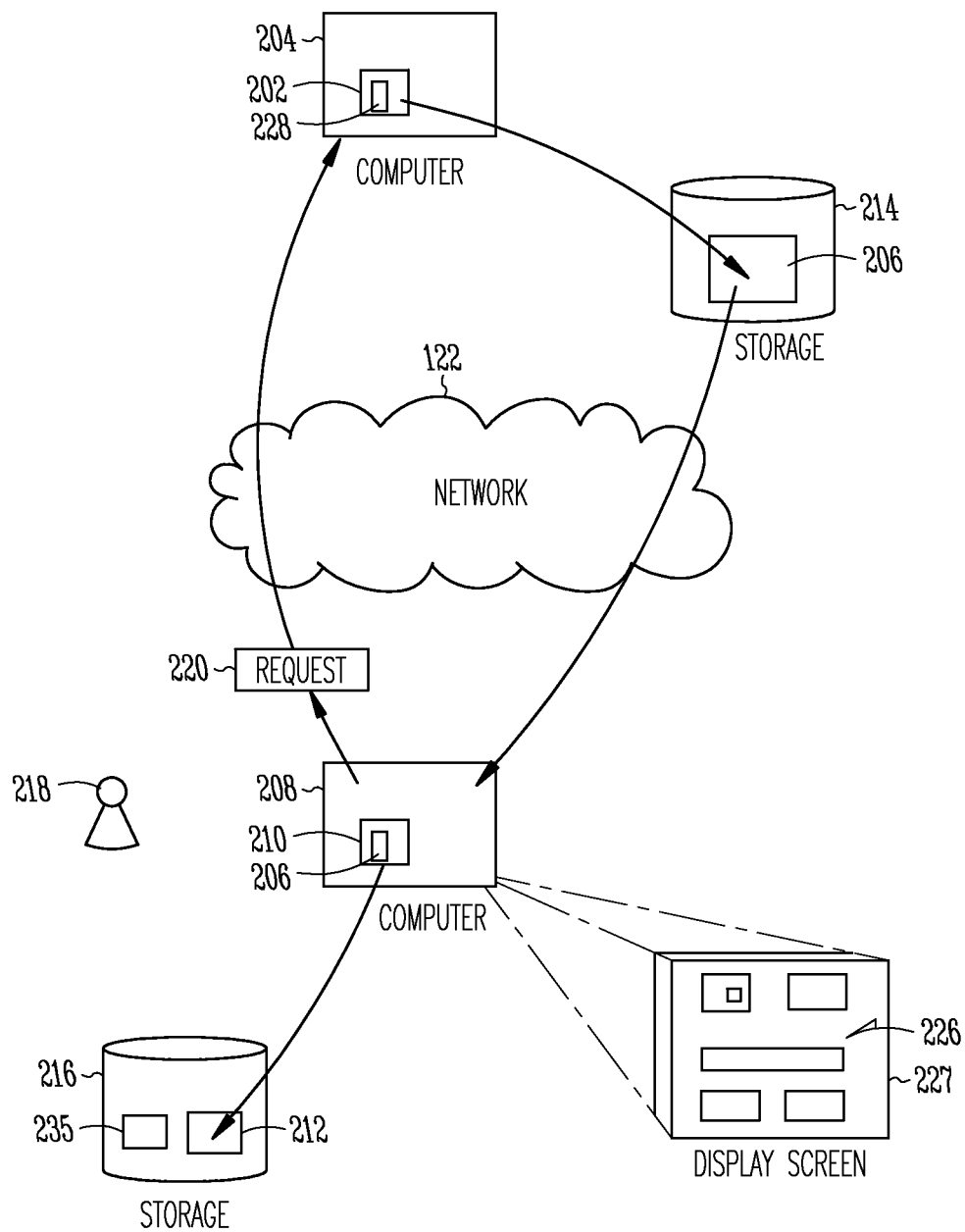
FIG. 2 is an illustrative functional block diagram representing a system and process in which a first computer program configures a first computer to produce first output information that acts as input to a second computer configured by a second computer program to produce second output information.

FIG. 2 is an illustrative functional block diagram representing a system and process in which a first computer program 202 configures a first computer 204 to produce first output information 206, which may comprise a sub-program, that acts as input to a second computer 208 configured by a second computer program 210 to produce second output information 212. The first output information 206 is stored in a computer readable storage device 214. The second output information 212 is stored in a second computer readable storage device 216.

More specifically, for example, in some embodiments of the system and process of FIG. 2, the first computer 204 is configured to operate as a web server, and the first computer program 202 running on the web server 204 produces the first output information 206 in the form of a code structure, and the second computer program 210 configures a second computer to act as a browser that produces the second output information 212 in the form of frame buffer data used to generate a user interface (UI) display 226 on a computer screen 227. In operation, for example, a user 218 of the second computer 208 causes it to send an information request 220 over a network 222 to the first computer 204. The first program 202 configures the first computer (the web server) 204 to generate the first output information 206 in the form of an HTML code structure in response to the request 220 and to send it over the network 222 to the second computer 208. The browser program 210 configures the second computer 208 to produce second output information 212 in the form of frame buffer information 212 used to generate an interactive UI display 226 on a display screen 227 in response to the HTML structure. In some embodiments, the first computer program 202 running on the web server 204 includes first code 228 represented in the Java Enterprise Edition language, for example, that is used to produce code structure 206 that includes HTML code. In some embodiments, the second computer program 210 configured to act as a browser includes the produced code structure 206 represented in the HTML, CSS and JavaScript languages (mash-up of the three languages), for example, that is used to generate the screen display 226.

Parsing States

Figure 3B:
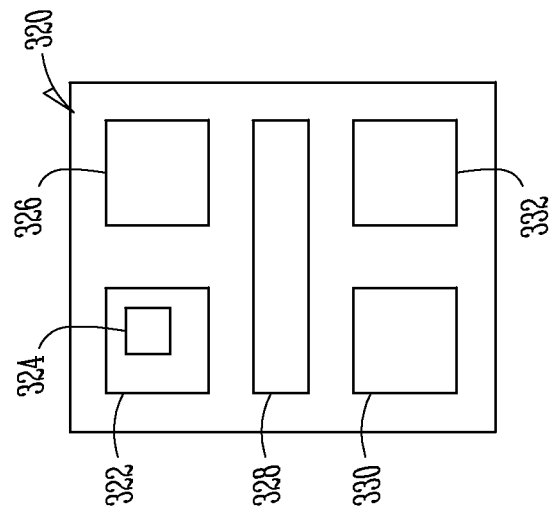
FIGS. 3A-3B are illustrative drawings showing certain details of an example HTML structure (FIG. 3A) and showing corresponding details of an example interactive UI display (FIG. 3B) that can be produced using the system and process of FIG. 2.
Figure 3A:
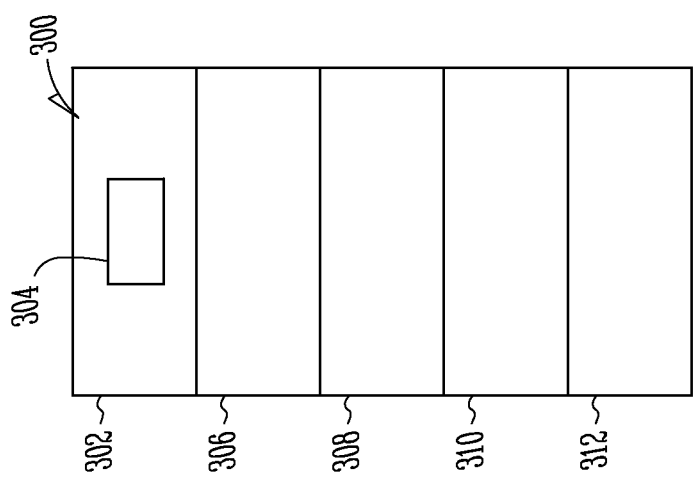

FIGS. 3A-3B are illustrative drawings showing certain details of an example HTML structure 300 (FIG. 3A) and showing corresponding details of an example interactive UI display 320 (FIG. 3B) that can be produced using the system and process of FIG. 2. More specifically, for example, the first computer 204 configured as a web server can generate the produced output information 206 in the form of an HTML structure 300, and the second computer 208 configured as a browser can use the HTML structure 300 to generate the screen display 320 comprising a web page. The HTML structure 300 of FIG. 3A includes information corresponding to first through sixth contexts 302-312. The HTML structure 300 is organized to indicate that the different contexts 302-312 are distinct although in this example, a second context 304 is nested within the first context 302.

As used herein, an 'HTML context' represents a set of one or more internal parser states reached by the HTML, JavaScript, and CSS parsers in the course of parsing the produced code 206 as a function of security obligations associated with the parser state. Each context 302-312 corresponds to some portion of the produced code 206 and also corresponds to a portion of the first program 202 used to produce that portion of the produced code 206. Security obligations are constraints that correspond to one or more internal parser states to identify parser state transitions that could be problematic in the event of the occurrence of a defect or vulnerability. It will be appreciated that a defect identified herein is a defect or vulnerability in the first computer program 202 that can result in a defect or vulnerability in the code structure 206 produced using the first computer program 202. The context referred to herein is an internal parser state of parsers of the second computer program 210 that includes one or more parsers to parse the produced code structure 206.

Figure 17A:
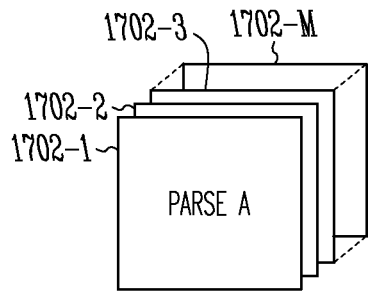
FIGS. 17A-17B are illustrative drawings representing multiple parsers (FIG. 17A) and a flow diagram representing a context identification process (FIG. 17B) performed using a static analysis tool in accordance with some embodiments.
Figure 17B:
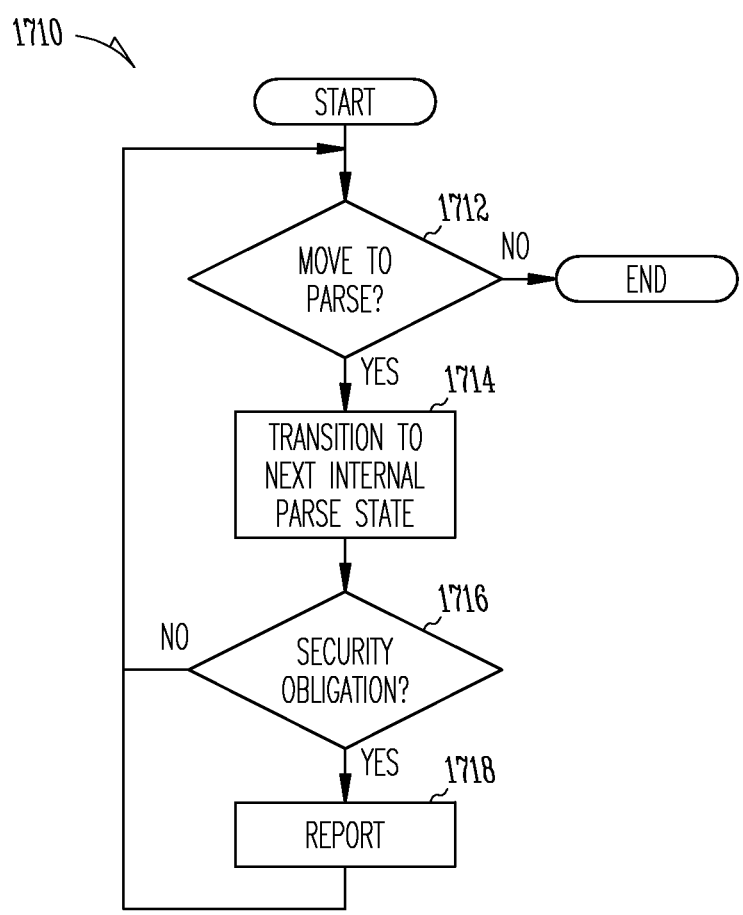

FIGS. 17A-17B are illustrative drawings representing multiple parsers (FIG. 17A) and a flow diagram representing a context identification process (FIG. 17B) performed using a static analysis tool in accordance with some embodiments. Referring to FIG. 17A, the produced code 206 may include code from multiple computer languages, and the second program 210 uses a different respective parser $1702a$-$1702m$ to parse the code of each different code language in the produced code 206. Referring to FIG. 17B, a static analysis tool configures a computer to run a context identification process 1710 upon the produced code 206 for each parser expected to be run by the second program 210. It will be understood that although only a context identification process 1710 is shown for only one parser, a similar process is run for each parser used by the second program 210. Decision module 1712 determines whether there are additional internal states to be processed. If no, the process ends. If yes, module 1714 transitions the parser to a next internal state. Decision module 1716 determines whether a security obligation is associated with the current parser state. It will be understood that a security obligation is associated with a potential defect or vulnerability, and consequently, associating the parser state with a security obligation also associates it with a potential defect or vulnerability. If no, the process transitions back to decision module 1712. If yes, module 1718 reports the parser state, which is regarded as a 'context' for a possible defect or vulnerability. Thus, it will be appreciated that the modules 1716-1718 report with precision occurrences of parser states that are associated with potential defects or vulnerabilities. As explained more fully below, understanding of these parser states can result in more precise remediation of actual defects or vulnerabilities.

Persons skilled in the art will understand that an internal 'parser state' is a current state of a parser process as it iterates over a grammar (or a language). The parser consumes elements of the grammar (tokens), and a typical logic implemented by the parser involves the parser, when in any given parse state, to look at what characters, grammar or token is/are next, for example, and to either create a transition to different parser state or stay in the same parser state but consume more characters, for examples. In accordance with some embodiments, a security obligation acts as a constraint that prevents the second program 210 from making a transition to a different parser state, particularly one which would typically trigger a defect. Stated differently, if a security obligation is not met then the second program 210 can make an erroneous transition, which may constitute a defect or vulnerability. A context is generated to identify these possible defects or vulnerabilities.

The example UI display 320 includes first through sixth display regions 322-332. In some embodiments, the display regions display interactive components such as fields in which a user can enter information and menu items that can be used to make selections and enter commands, for example. The second computer 208 configured as a browser uses the contexts 302-312 in conjunction with a document object model (DOM) 235 stored in storage 216 to generate frame buffer information 212 used to produce the corresponding display regions 322-332 within the UI display 320. For example, the first context 302 is used to generate the first display region, and the second context 304 is used to generate the second display region 324.

Associating Contexts and Code Statements

Figure 4:
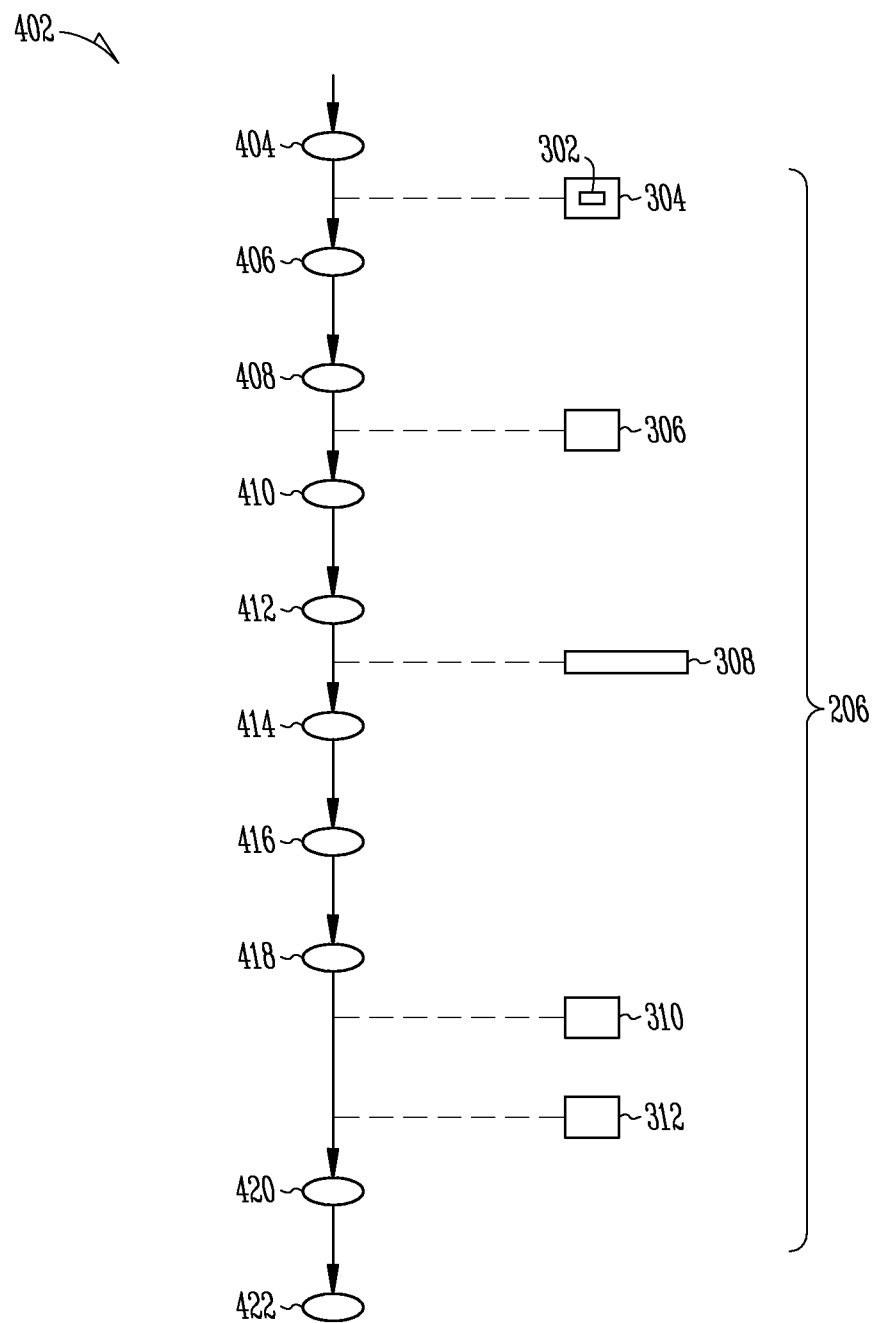
FIG. 4 is an illustrative drawing representing an example code path from the first program, which includes a sequence of code statements in program execution order and showing a relationship between the code statements and the contexts in accordance with some embodiments.

FIG. 4 is an illustrative drawing representing an example code path 402 from the first program 402, which includes a sequence of code statements 404-422 in program execution order and showing a relationship between the code statements 404-422 and the contexts 302-312 in accordance with some embodiments. In the example code path 402, contexts 302 and 304 correspond to code statement 404. Context 306 corresponds to code statement 408. Context 308 corresponds to code statement 412. Contexts 310 and 312 correspond to code statement 418. As explained above, the contexts 302-312 represent an example of first output information 206 produced by the first computer 204 configured as a web server.

Static analysis can be performed on static code (i.e., code that is not running during the analysis process) to identify weaknesses and/or errors in the code. Static analysis tools can detect errors that are often missed when using dynamic analysis tools alone. For example, static analysis may detect an illegal operation that is contained in a rarely traversed or otherwise hard-to-test conditional branch code path. Because the path is so rarely visited during operation of the software, this error might not be detected using a dynamic analysis tool. Commonly owned U.S. Pat. No. 7,340,726 invented by Chelf et al., which is expressly incorporated herein in its entirety by this reference describes known static analysis techniques in accordance with some embodiments.

Static analysis can involve use of numerous different static analysis programs/software tools often referred to as 'checkers' to evaluate code paths to identify vulnerabilities and/or errors. For example, checkers can be used to detect syntax errors, functions without return values, variables that have been declared but not used, inadvisable automatic type conversions, 'taint' analysis aimed at identifying tainted data, integer overflows, or global-variable inconsistencies, problems associated with using modules (e.g., missing or invalid modules or input/export mismatches), to name just a few.

It is known to persons skilled in the art that static analysis techniques can be used to identify a program output produced by a computer program. In particular for example, static analysis techniques can identify a produced output information 206 in the form of an HTML structure 300 is produced by the first computer program 202 running on the first computer 204 configured to act as a web server. Even more particularly, for example, the contexts 302-312 can be for HTML structure 300 can be identified through static analysis. Other examples of such instances in a program include but are not limited to the generation of SQL queries, XML structures, file path locations, etc.

For example, programs generated by web applications are manipulated as strings. Static analysis tracks the possible combination of strings that are generated by a program (abstract program). For example, static analysis is used to track the creation of HTML pages, which are output as a sequence of strings by the program code. Moreover, for example, static analysis can determine the possible values of string variables in a program by following different program paths and determining the value of the strings output on each path. In particular, for some defect types like cross-site scripting (XSS), the output is a buffered stream that "prints" the output string by string. The static analysis can determine the strings output in a linear fashion on each path to determine the possible structure of the output.

Figure 5:
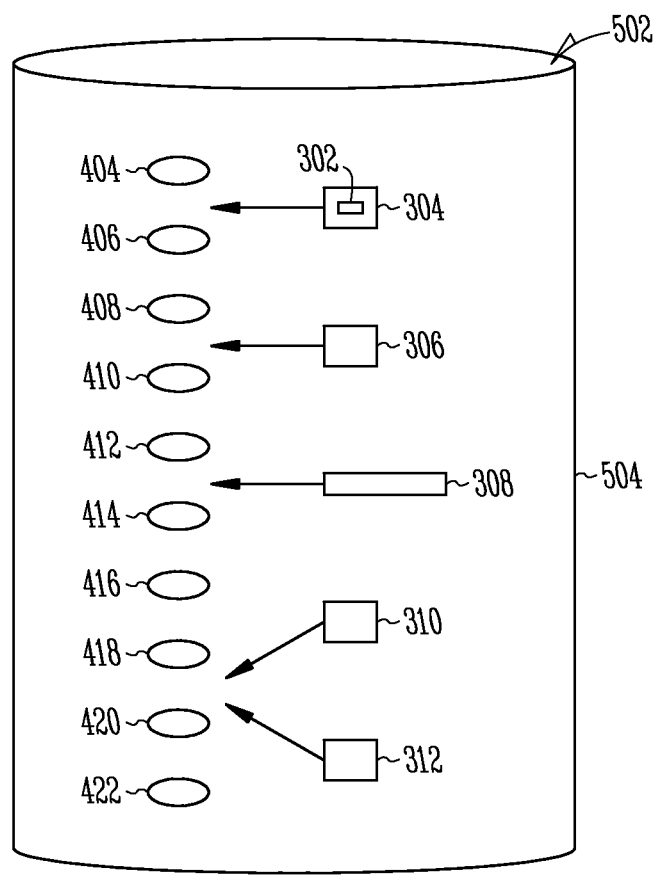
FIG. 5 is an illustrative drawing representing a data structure stored in a computer readable storage device in accordance with some embodiments.

FIG. 5 is an illustrative drawing representing a data structure 502 stored in a computer readable storage device 504 in accordance with some embodiments. In the example data structure 502, HTML contexts 302-312, i.e. parser states corresponding to portions of the code produced using the first program 202, are correlated with code statements 404-422 from the first program 102 used to produce the produced code 206 that corresponds to the contexts. More particularly, the data structure 502 organizes code statements 404-422 in a stack arrangement in execution path order. The data structure 502 interleaves respective contexts with code statements in the stack structure 502 between respective code statements executed before and after its creation during execution of code statements in the code path 402. For example, contexts 302 and 304 are interleaved in the data structure between code statements 404 and 406. Context 406 is interleaved in the data structure 502 between code statements 408 and 410. Context 308 is interleaved in the data structure 502 between code statements 412 and 414. Contexts 310 and 312 are interleaved in the data structure 502 between code statements 418 and 420.

Static Analysis to Identify Defects and Technology

Figure 6:
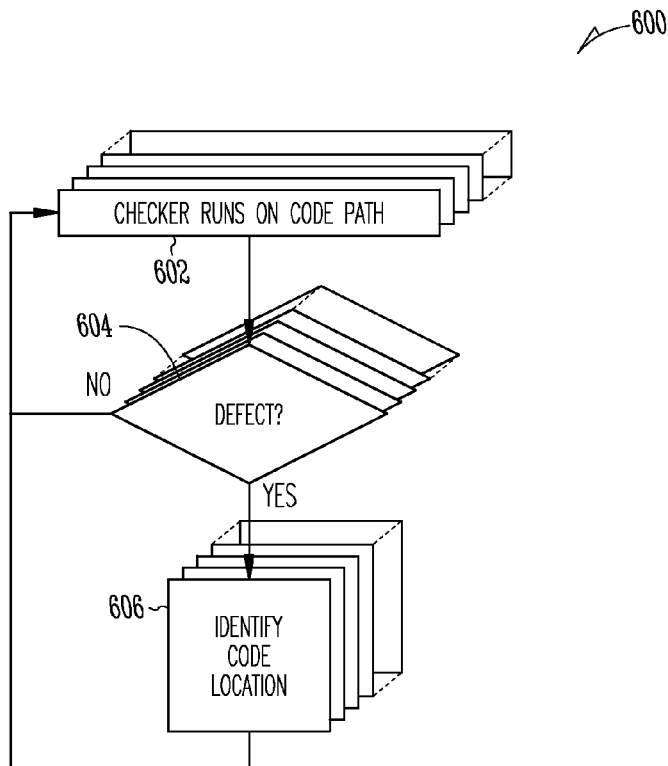
FIG. 6 is an illustrative flow diagram showing a process to identify defects and collect information to remediate the defects in accordance with some embodiments.

FIG. 6 is an illustrative flow diagram showing a process 600 to identify defects and collect information to remediate the defects in accordance with some embodiments. Referring back to FIG. 2, for example, static analysis is run on the first program 202 that produces output information 206, understand a defect in the first program 202, for example. Assume, for example, that the first program 202 is a web application that generates an HTML that includes an XSS defect that involves dynamic data within the produced code 206, for example. A static analysis is run to understand the generated HTML so as to gain a more complete understanding of an instance of an XSS (defect).

Referring again to FIG. 6, module 602 configures a computer system to run a static analysis checker process on code statements of the selected code path within the first computer program 202. Typically, running a checker process involves following (tracing) a path from one code statement to the next in the first computer program 202. The path may branch into branching paths in which case the checker process typically will be run on all branch paths. A checker process may attempt to traverse every possible unique path within first computer program 202. The method of accomplishing a complete traversal may vary. Methods include, but are not limited to, depth-first and breadth-first search, and using recursion to provide coverage or using work lists to record paths that must be traversed as branches are encountered. Path traversal continues until all paths within the first program 202 have been traversed. In the course of the code path traversal(s), decision module 604 determines whether a defect is identified with reference to a code statement in a currently traversed path. If no, then the traversal continues. If yes, then module 606 identifies a location within the first computer program 202 of the code statement for which the defect is identified.

As shown in FIG. 6, numerous different checker processes may be run in the course of traversal of the first computer program 202. Different checker process may check for the presence of a different defect type among code statements within the first computer program 202. Additionally, checkers may check to determine the technology used to create different portions of the first computer program 202 including creation of individual statements for example. Thus, in the course of traversal of the many code paths within the first computer program, the multiple checkers may check the code statements of each given path, each checker checking for a different defect type and for the technology used to creat the code on the path. The decision module 604 identifies defects for and the code statement identification module 606 associate defect types with code statements for each different checker process. Thus, multiple different types of defects may be identified for one or more code statements within any given code path.

Figure 7:
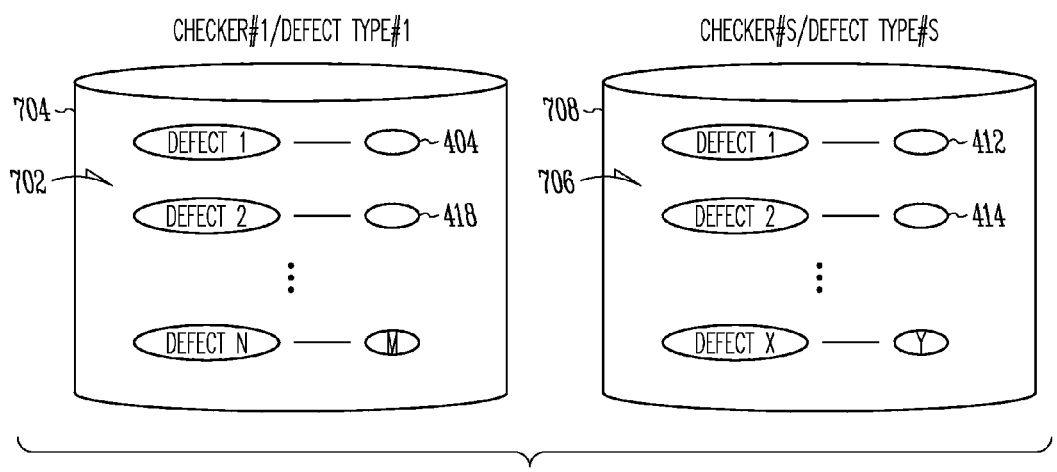
FIG. 7 is an illustrative drawing representing example data structures stored in a computer readable storage device that indicate defects and corresponding code statement locations identified by different checkers according to the process of FIG. 6 in accordance with some embodiments.

FIG. 7 is an illustrative drawing representing example data structures stored in a computer readable storage device that indicate defects and corresponding code statement locations identified by different checkers according to the process of FIG. 6 in accordance with some embodiments. Running checker "#1" results in production of a data structure 702 in storage device 704 that indicates "M" defects of the type associated with checker 1. Defect 1 identified by checker #1 is associated with the code statement 404; defect 2 of checker #1 is associated with code statement 418; etc. Running checker "#S" results in production of a data structure 706 in storage device 708 that indicates "Y" defects of the type associated with checker #S. Defect 1 identified by checker #S is associated with the code statement 404; defect 2 of checker #S is associated with code statement 418; etc.

Determining Remediation Based Upon Defect Type, Context and Technology

Figure 8:
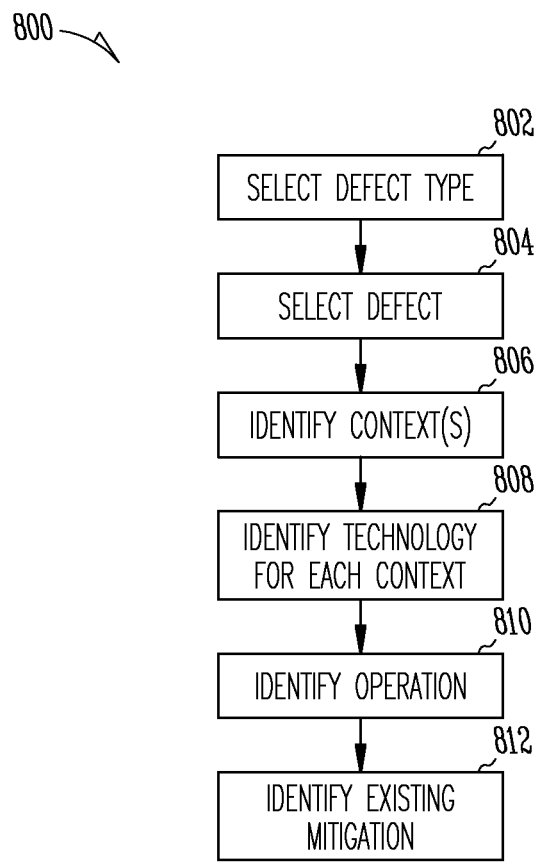
FIG. 8 is an illustrative flow diagram of a process to assemble attributes of identified defects for later use in remediation in accordance with some embodiments.

FIG. 8 is an illustrative flow diagram of a process 800 to assemble attributes of identified defects for later use in remediation in accordance with some embodiments. Module 802 selects a defect type from the collection of defect types indicated in FIG. 7. As explained above, each different checker process checks for a different defect type. Module 804 selects an identified defect of the selected defect type. The data structures of FIG. 7 indicate the defects identified for each different defect type. For example, module 802 may select defect type #1, and module 804 may select defect 1 from within the data structure 702 that indicates the defects identified by checker #1 for defect type #1.

Module 806 identifies a context that corresponds to the selected defect. Referring to FIG. 17B, recall that contexts are identified using static analysis of the produced code 206 that correspond to one or more parser states that may be associated with a security obligation, that is an obligation associated with a potential defect or vulnerability. Referring to FIG. 5, the data structure 502 correlates code statements of the first computer program 202 traversed during path traversal with contexts that correspond to portions of the produced code 206 that is produced in response to the code statements. Continuing with the above example, the data structure 602 of FIG. 7 indicates that defect 1 of defect type #1 is associated with code statement 404, and data structure 502 of FIG. 5 indicates that contexts 302 and 304 correspond to statement 404. The data structure 502 interleaves contexts within a stack of code statements ordered in execution path order in the storage device 504. Thus, one or more output information contexts for produced code can be identified for the code statement that is associated with the selected defect. Note that defects such as defect 414 that do not involve context are not described.

Figure 18A:
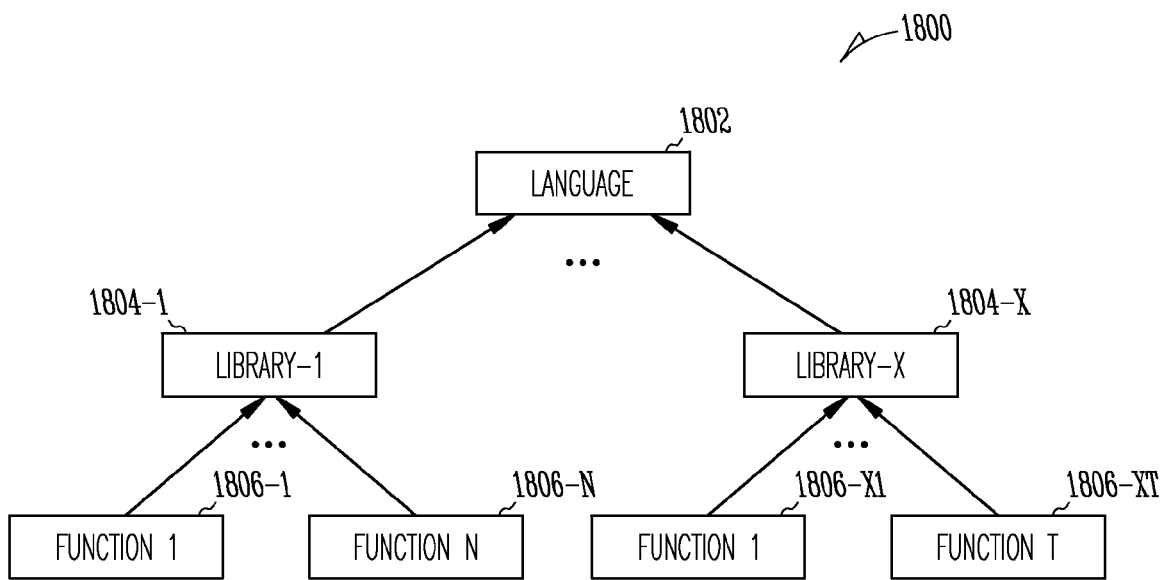
FIGS. 18A-18B are illustrative drawings representing illustrative information structures stored in computer readable storage device representing a hierarchy of technologies (FIG. 18A) and a specific example of hierarchy of technologies (FIG. 18B) in accordance with some embodiments.
Figure 18B:
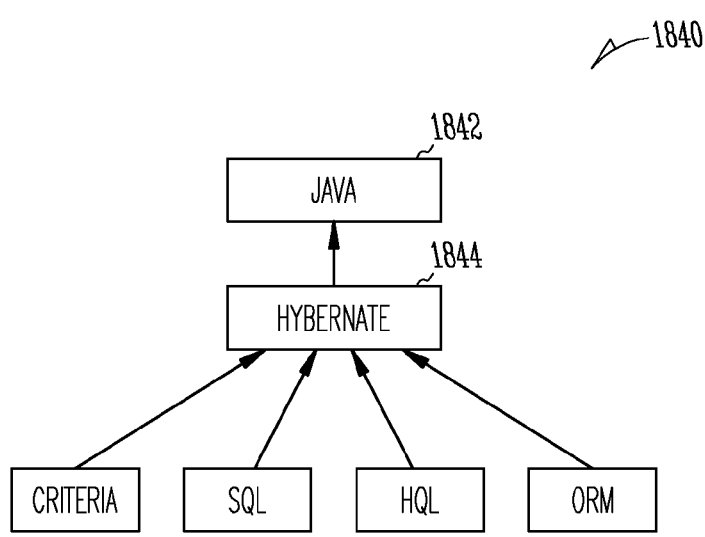

Module 808 identifies a technology associated with the identified code statement from the first computer program 202. Referring to FIGS. 18A-18B, there are shown illustrative information structures stored in computer readable storage device representing a hierarchy of technologies (FIG. 18A) and a specific example of hierarchy of technologies (FIG. 18B) in accordance with some embodiments. The structure 1800 of FIG. 18B indicates language 1802. The language includes multiple libraries 1804-1 to 1804-x. Each library includes multiple functions. Library 1804-1 includes functions, function-1 to function-n. Library 1804-x includes functions, function-x1 to function-xt. Thus, for example module 804 might use the information structure 1800 to determine that a developer of the first program 202 uses function-n 1806-n in library-1 1804-1 of the language 1802 to create a code statement that is associated with an identified defect.

The structure 1840 of FIG. 18B provides a more specific illustrative example. The technology includes a language 1842, which is JAVA in this example. The technology includes a library 1844, which is Hibernate in this example. The library may include a library subset, such as a set of functions provided by the library such as a 'DSL' (domain specific library) such as HQL, for example. Other example Hibernate library sets include, Criteria, SQL and ORM, for example.

Module 810 identifies an operation (a high level summary of the code statement) associated with the code statement. Identification of the operation is used to determine how to generate a code fix (or patch). A patch is generated that fits the current code statement based upon the type of operation.

Module 812 identifies existing remediation associated with the code statement. The presence of existing remediation, if one exists, means that the code statement employs part of what may have been considered to be an ideal remediation. However, since it is incomplete we choose to keep this part and to add an appropriate remediation fragment to it to complete it. Note that in some embodiments, the 'existing remediation' is not gathered (or computed) at this stage but earlier (during the static analysis/checker phase).

FIG. 9 is an illustrative drawing representing a remediation obligation data structure 902 produced according to the process of FIG. 8 in accordance with some embodiments. The data structure 902 is stored in a computer readable device 904. The data structure indicates a defect-related information for a given defect including: defect type, a code statement identified as being associated with the defect type, a context corresponding to produced code identified as being associated with the code statement, a technology used by the code statement operation associated with the code statement and an existing remediation associated with the defect.

It will be appreciated that the decision module 1716 of FIG. 17B may refer to such an obligation data structure to identify security obligations associated with a particular parser state.

Referring to FIG. 5, for example It will be appreciate that a code statement may be associated with more than one defect of a given defect type. Referring to FIG. 5, for example, it can be seen that code statement 404 is associated with two contexts 302 and 304 that are associated with the same defect type. In accordance with some embodiments, a separate remediation obligation data structure is created for each context that is associated with the same code statement and the same defect type. More particularly, for example, a code statement, may be associated with a stack of context (nested contexts), in which case separate obligations are created for each of the nested context.

Defect-related information provided by the remediation obligation data structure 902 is used to determine a remediation for a defect identified by the data structure. As explained below with reference to FIGS. 10A-12, a defect type, context and technology identified within a remediation obligation data structure are used to identify remediation fragments, which are assembled into a remediation recommendation. As explained below with reference to FIG. 13, a code statement identified within a remediation obligation data structure is used to determine a location within code of the first computer program 202 to associate the remediation recommendation. Moreover, an operation identified within a remediation obligation data structure is used as a constraint to generate a possible code fix (or patch). An existing remediation identified within a remediation obligation data structure is used as another constraint. Essentially, when an existing remediation is detected, we force a remediation engine to use this existing remediation (for one or many nested contexts according to what is safe).

Figure 10A:
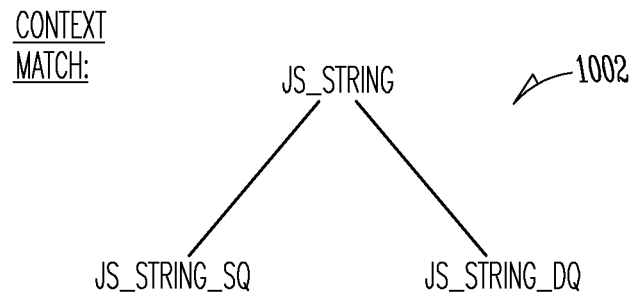
FIGS. 10A-10B are illustrative drawings representing data structures stored in a computer readable storage device that act as a contexts hierarchy database (FIG. 10A) and as a technologies hierarchy database (FIG. 10B) in accordance with some embodiments.
Figure 10B:
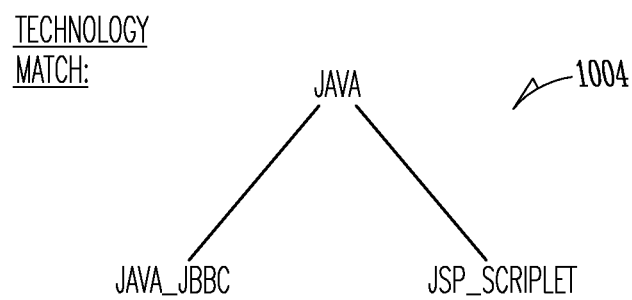

FIGS. 10A-10B are illustrative drawings representing data structures stored in a computer readable storage device that act as filters used to determine a best match between a context identified within remediation obligation data structure 902 and contexts identified within a context hierarchy database (FIG. 10A) and to determine a best match between technology identified within a remediation obligation data structure 902 and technology identified within a technologies hierarchy database (FIG. 10B). The databases of FIGS. 10A-10B include a list of pre-defined hierarchies associated with parse states and technologies.

FIG. 10A represents a hierarchical tree data structure 1002 representing a context hierarchy structure that is stored in a context relationships database 1003 in a computer readable storage device 1005 in accordance with some embodiments. More specifically, the context hierarchy structure 1002 shows hierarchical relationships between parse states. This structure 1002 indicates that the security obligations of the children, (js_string_sq and js_string_dq), are included in the parent (js_string). Basically, in this example, there are three different parsing state classifications: js_string_sq, js_string_dq and js_string. In the lower level of the structure of FIG. 10A are children which are essentially capture higher level parent information. It will be appreciated, for example, that in some embodiments a security obligation may have been created that corresponds to js_string, but that no security obligation has been created that corresponds to either js_string_sq or js_string_dq. In that case, the information structure of FIG. 10A could be used to match either of a js_string_sq parse state or a js_string_dq parse state, identified for the second code 206, to the security obligation that corresponds to the js_string parse state. In that case, for example, the js_string parse state would serve as the context for each of a js_string_sq parse state, a js_string_dq parse state or a js_string parse state identified for the second code 206.

Alternatively, for example, in some embodiments security obligations may have been created that have entries that corresponds to both js_string_sq and js_string_dq. In that case, the information structure of FIG. 10A could be used to match a js_string_sq parse state identified for the second code 206 to a corresponding security obligation that contains a js_string_sq parse state entry and to match a js_string_dq parse state identified for the second code 206 to a corresponding security obligation that contains a js_string_dq parse state entry.

Referring back to FIG. 17B and assuming, for example, that the produced code 206 includes both a js_string_sq parse state and a js_string_dq parse state, but that a security obligation exists only for a js_string parse state, the, module 1716 would report the context for each of the parse states a js_string_sq and js_string_dq as being js_string.

It will be appreciate that this hierarchy involving js_string and js_string_sq and js_string_dq is merely an example and other context hierarchies may be used such as SQL string hierarchy, SQL keyword hierarchy, HTML attribute hierarchy, CSS string, URI, etc.

FIG. 10B represents a hierarchical tree database data structure 1004 representing a technology hierarchy that is stored in a technology relationships database 1007 in a computer readable storage device 1009 in accordance with some embodiments. Similar to contexts, the tree 1004 defines an inclusion. For instance, JSP_scriptlet is using Java, but in addition to this, we capture that this is in JSP and using Scriptlet. This structure 1004 indicates that the security obligations of the children (JAVA_JBBC and JSP_Scriplet), are included in the parent (JAVA). Basically, in this example, there are three different technology state classifications: JAVA, JABVA_JBBC and JSP_Scriplet. In the lower level of the structure of FIG. 10B, children technologies essentially capture higher level parent information.

It will be appreciated, for example, that in some embodiments a security obligation may have been created that corresponds to JAVA, but that no security obligation has been created that corresponds to either JAVA_JDBC or JSP_SCRIPLET. In that case, the information structure of FIG. 10B could be used to match either of a JAVA_JDBC technology or a JSP_SCRIPLET technology identified by a static analysis tool as a technology used to create one or more code statements in the first program code 202 to the security obligation that corresponds to JAVA. In that case, for example, the JAVA technology would serve as the context for each of a JAVA_JSBC and a JSP_SCRIPLET technology for the one or more code statements of the first code 202.

Alternatively, for example, in some embodiments security obligations may have been created that have entries that corresponds to both JAVA_JSBC and JSP_SCRIPLET. In that case, the information structure of FIG. 10B could be used to match a JAVA_JBBC technology identified for a code statement of the first program 202 to a corresponding security obligation that contains a JAVA_JSBC technology entry and to match a JSP_SCRIPLET technology identified for a code statement of the first program 202 to a corresponding security obligation that contains a JSP_SCRIPLET technology entry.

It will be appreciated that this hierarchy involving JAVA and JSP_SCRIPLET and JAVA_JDBC is merely an example and other technology hierarchies may be used such as JSP, EL, Hibernate, Hibernate Query Language, etc.

As used herein, the term "technology" can refer to a language, including domain specific languages such as a templating language such as JSP or REL and to application programming interfaces (API) such as APIs to different libraries.

Figure 11:
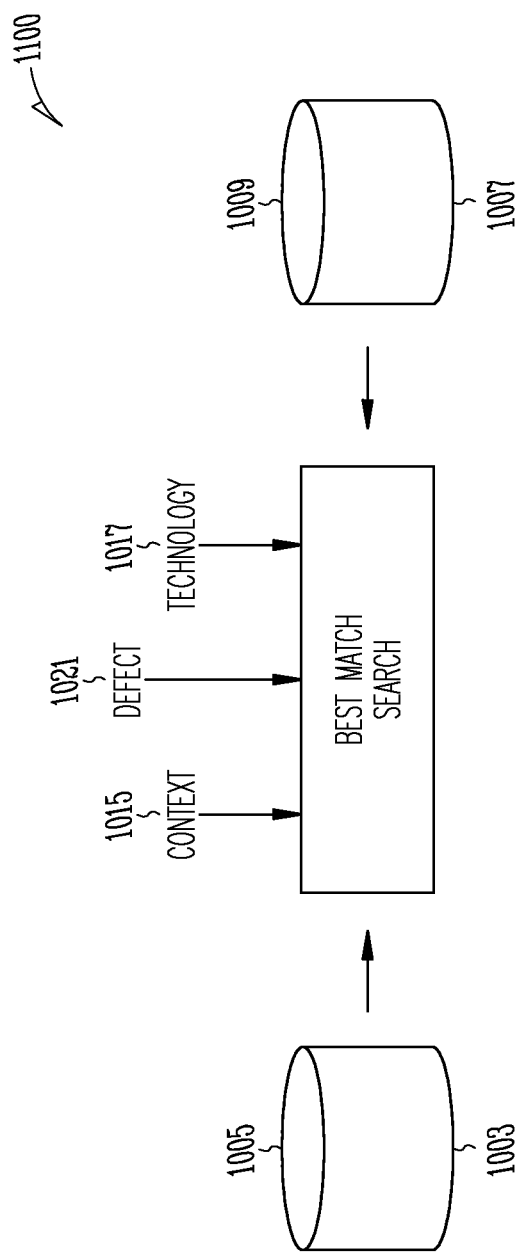
FIG. 11 is an illustrative block diagram of a system to match context associated with a defect with a context indicated in the context relationships database and to match technology associated with the detected defect with a technology indicated in the technology relationships database in accordance with some embodiments.

FIG. 11 is an illustrative block diagram of a system 1100 to match context 1015 associated with a defect 1021 with a context indicated in the context relationships database 1003 and to match technology 1017 associated with the detected defect 1021 with a technology indicated in the technology relationships database 1007. Module 1102 configures a computer to implement a best match process that minimizes (i. e. optimizes) differences (or distance) between a requested pair (context stack 1015, technology 1017) as a function of defect type 1021 to select contexts and technologies from the databases 1003, 1007. In some embodiments, the match process tries to find a "best match" given a kind of technology and context. It holds the technology as a known value and then tries to relax the context. Basically, a more generic remediation that loses information about the context is acceptable if it is at least technology-specific. Making the technology more generic loses the specificity of the remediation advice, making it more like documentation describing the general way the defect is fixed, rather than giving concrete advice specific to the technology being used and a patch for the code.

Figure 12:
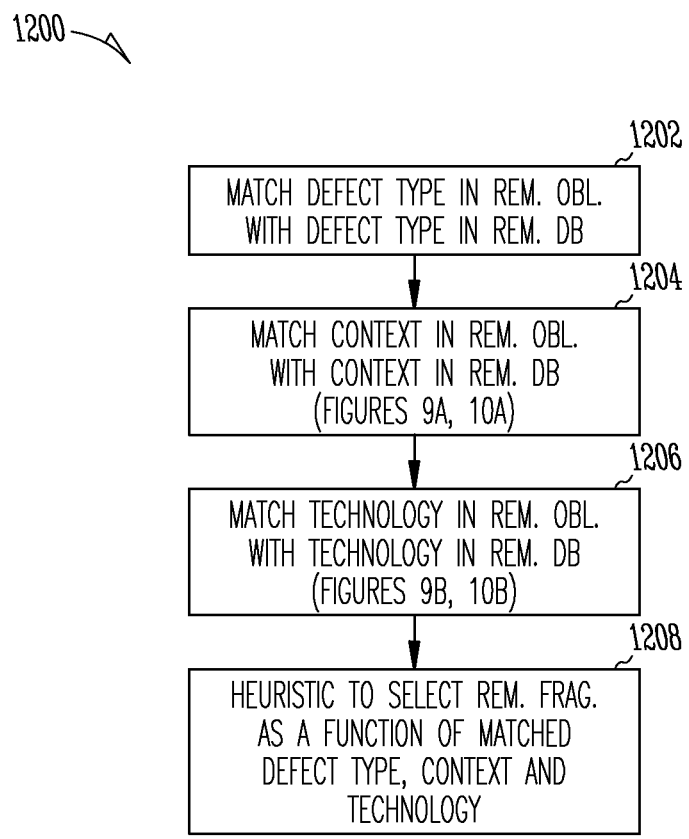
FIG. 12 is an illustrative flow diagram representing a process to determine remediation fragments for an identified defect based upon defect type, context and technology in accordance with some embodiments.

FIG. 12 is an illustrative flow diagram representing a process 1200 to determine remediation fragments for an identified defect based upon defect type, context and technology in accordance with some embodiments. As used herein the term 'remediation fragment' means information stored in a computer readable device that contains information that can be used to remediate a specific context (within a stack of contexts representing the output location of a defect). In some embodiments, a remediation fragment includes: context, technology a description (text) and code to be used to fix the defect.

To generate a complete remediation for a stack of contexts, the remediation for each combination of context and technology is determined by looking up a corresponding description and code fix as a function of context and technology. The resulting descriptions are appended to the overall remediation description (e.g. appended for all contexts in the stack into the template for the advice). The code is also appended/assembled with other code fragments for other contexts to give the user a complete code example for how the defect should be fixed.

Module 1202 matches defect type indicated in the remediation obligation data structure 902 with a defect type in a remediation fragments database. Module 1204 matches a context indicated in a remediation obligation data structure 902 with a context indicated in the remediation fragments database. Module 1204 uses the context data structure 1002 of FIG. 10A. Module 1206 matches a technology indicated in a remediation obligation data structure 902 with a technology indicated in the remediation fragments database. Module 1206 uses the remediation fragments context data structure 1004 of FIG. 10B. Module 1208 applies the best match process that minimizes (i. e. optimizes) differences (or distance) between a requested pair (context stack, technology) and available ones. to select remediation fragments as a function of the matched defect type, matched context and matched technology.

Figure 13:
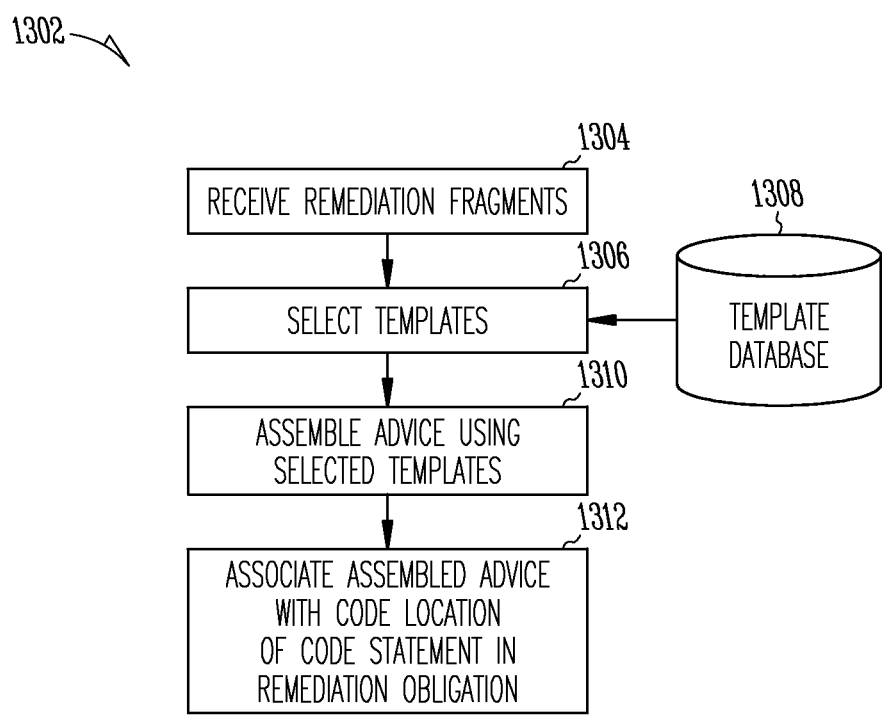
FIG. 13 is an illustrative flow diagram representing a process to assemble advice based upon remediation fragments returned by the process of FIG. 12 in accordance with some embodiments.

FIG. 13 is an illustrative flow diagram representing a process 1302 to assemble advice based upon remediation fragments returned by the process of FIG. 12 in accordance with some embodiments. Module 1304 receives remediation fragments selected using the heuristic of module 1208 of FIG. 12. Module 1306 selects one or more templates for use in assembling advice to a user. A template database provides a selection of templates. In accordance with some embodiments, the template database contains multiple templates used to generate a final remediation advice from remediation fragments. A template directs the structure of how the fragments will be composed together, and how the code (present in each fragment) is also combined. A computer is configured to use search criteria to identify an appropriate template for use in composing fragments is based upon properties of all the remediation fragments. For example, some fragments are known to be composable (as in function composition). The criteria are used to determine whether all fragments are composable. if so an appropriate template is selected that will allow the composition of all the remediation fragments.

Module 1310 uses the selected templates to assemble advice for presentation to a user. In accordance with some embodiments, the assembly of advices is determined by the selected template. Each remediation fragment is integrated into the template based on the properties of the template itself. A computer is configured to use the selected template t direct it in the composing advice. For example, the template may direct ordering of advice as: functional and syntactical composition, append to a list of advices (advice 1, advice 2, etc.)

Module 1312 associates the assembled advice with code location within the first computer program 102 of the code statement indicted within the remediation obligation. A user viewing the source code of computer program 202 can also view the assembled advice that is associated with the code. For example, the code and the advice, which are stored in a computer readable device, can be viewed using a computer display screen.

Example

Cross-Site Scripting Defect—Web Application/Browser

Figure 14:
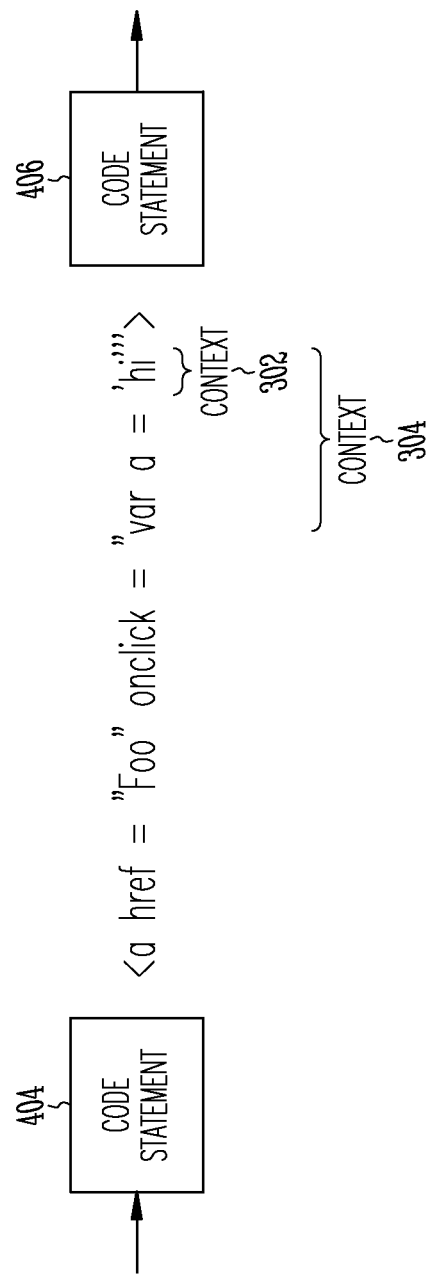
FIG. 14 is an illustrative drawing showing example details of a portion of produced output information in accordance with some embodiments.

FIG. 14 is an illustrative drawing showing example details of a portion of produced output information 206 in accordance with some embodiments. More specifically, FIG. 14 shows example details of output information produced in response to code statement 404 of FIG. 4. Even more specifically, FIG. 14 shows example details of a portion of the data structure 302 of FIG. 5 in which contexts 302 and 304 are interleaved between code statements 404 and 406. In this example, assume that the defect type is cross-site scripting and that 'hi' is a potentially tainted data. Assume that the first context 302 is the output portion 'hi', which is indicated between the single quote marks. Assume that the second context 304 is the output portion "var α='hi'", which is indicated between the double quote marks. Note that in this example, the first context 302 is nested within the second context 304. Note that the other code between "< >" is not relevant per se, and is included to show syntactic correctness.

In some embodiments, contexts interleaved within a code stack are identified based upon one or more language parsers. When multiple languages are involved, the parsing of the languages is nested for example. For example, Assuming that a first parser for a language 1 starts and proceeds until it perceives a transition to another language, language 2, in which case it derives the context from its parser state. A second parser starts parsing the nested language, language 2, and so on. When a nested language is parsed, the parser creates a transition to the parent language (e.g., language 2 to language 1)

In accordance with some embodiments, the output 206 is consumed by a machine, e.g., a computer, configured to simulate a web browser in the case of HTML pages. This machine is configured to implement several language parsers (e.g., HTML, CSS, JavaScript which are different languages). The machine picks up one language to start parsing (based upon the first language in HTML pages which is always HTML), and consumes the tokens until a transition to another language is detected (defined the specification for HTML). In this case, the parser for another language (JavaScript for example) starts the parsing and consumes the nested language tokens. The parse states are used to derive a context for each of the nested languages (here, HTML and JavaScript in this example). Finally, these contexts are composed together as a stack of context (nested contexts) associated with the code statements that were parsed to arrive at the contexts.

FIG. 15 is an illustrative drawing representing a remediation obligation data structure 1502 produced for the first context 302 shown in FIG. 14. The data structure 1502 indicates that the defect type is cross-site scripting. The associated code statement is indicated to be code statement 404. Thus, advice to a user for the remediation of this defect will be associated with code statement 304 of the first computer program 202. The context is indicated to as 'hi' JS_string_SQ. The technology is JSP_scriptlet, which is the technology used by the first computer program 202 to produce this 'hi' portion of the output. The existing remediation is not specified. In this example since the existing remediation is not present in the code 202, it is not part of the remediation obligation data structure.

FIG. 16 is an illustrative drawing representing a remediation obligation data structure 1602 produced for the second context 304 shown in FIG. 14. The data structure 1602 indicates that the defect type is tainted data. The associated code statement is indicated to be code statement 404. Thus, as mentioned above, advice to a user for the remediation of this defect will be associated with code statement 404 of the first computer program 202. The context is indicated to as HTML_ATTR_DQ. The technology is Java, which is the technology used by the first computer program 202 to produce this "var α='hi'" portion of the output. The existing remediation is not specified.

The remediation advice that is provided in a computer readable storage device for the example first context 302 is to use the code: htmlEscape. More particularly, for example, remediation for cross-site scripting in EL: Escaping needs to be done for all of the contexts in the following order, for example, htmlEscape(JS_StringEscape(hi), where JS_StringEscape is a function from Coverity that escapes tainted data (for JavaScript string).

The remediation advice that is provided in a computer readable storage device for the example second context is to use the code: JS_stringEscape. More specifically, htmlEscape escapes tainted data (for HTML attribute).

The nested advice that is provided in a computer readable storage device for both context 302 and context 304 is expressed as: htmlEscape (JS_stringEscape(tainted data)).

The invention claimed is:

1. A method to remediate a defect in first computer program code used to configure a first computer to produce code in response to a request from a different computer configured using second computer program code, to use the produced code to parse one or more contexts within the produced code, each context corresponding to one or more parser states and to generate output information, the method comprising:
configuring a computer to perform static analysis of the first computer program code that includes,
simulating the first computer configured, to produce, in a non-transitory computer readable storage device, at least a portion of the produced code that includes one or more contexts;
simulating the different computer configured, to identify one or more parser states that correspond to the one or more contexts in the at least a portion of the produced code;
producing a first information structure in a non-transitory computer readable storage device that associates a respective code statement of the first computer program code with at least one context that corresponds to at least one identified parser state; and
configuring a computer to perform a static analysis of the first computer program code that includes,
running multiple checkers to identify one or more defect types in the first computer program code;
producing a second information structure in a non-transitory computer readable storage device that associates the respective code statement of the first computer program code with the one or more identified defect types;
identifying a technology used by the first computer program code to represent the respective code statement; and
determining a remediation for an identified defect type that is associated by the second information structure with the respective code statement, based upon at least, the at least one context that is associated by the first information structure with the respective code statement, and the identified technology.

2. The method of claim 1,
wherein the identified one or more parser states are parser states that are expected to be reached in the course of the second computer program code causing the same or a different computer to parse the produced code.

3. The method of claim 1 further including:
providing a plurality of respective remediation obligation information structures in a non-transitory computer readable storage device that respectively associate defect types, parse states, technologies and remediations;
wherein determining a remediation includes determining a match between the identified defect type, the at least one context and the identified technology and respective defect types, parse states and technologies of the respective remediation obligation information structures.

4. The method of claim 3,
wherein determining a match includes determining a best match from among multiple possible matches.

5. The method of claim 1 further including:
providing in a non-transitory computer readable storage device, a third information structure that associates at least one parser state with one or more obligations;
wherein the third information structure includes a context hierarchy information structure in a computer readable storage device that indicates a hierarchy of parse states; further including:
providing a plurality of respective remediation obligation information structures in a computer readable storage device that respectively associate defect types, parse states, technologies and remediations;
wherein producing the second information structure that associates the respective code statement of the first computer program code with at least one context includes using the context hierarchy information structure to identify a parse state that corresponds to a parse state in one or more remediation obligation information structures; and
wherein determining a remediation includes determining a match between the identified defect type, the at least one context and the identified technology and respective defect types, parse states and technologies of the respective remediation obligation information structures.

6. The method of claim 3 further including:
providing a technology hierarchy information structure in a computer readable storage device that indicates a hierarchy of parse states;
providing a plurality of respective remediation obligation information structures in a computer readable storage device that respectively associate defect types, parse states, technologies and remediations;
wherein identifying the technology used to create the respective code statement includes using the technology hierarchy information structure to identify a technology that corresponds to a technology in one or more remediation obligation information structures; and
wherein determining a remediation includes determining a match between the identified defect type, the at least one context and the identified technology and respective defect types, parse states and technologies of the respective remediation obligation information structures.

7. The method of claim 1 further including:
using the first computer program to configure the computer to use the respective code statement to produce the at least a portion of the produced code.

8. The method of claim 1 further including:
providing in a non-transitory computer readable storage device, a third information structure that associates at least one parser state with one or more obligations;
wherein the first information structure in the non-transitory computer readable storage device associates each of multiple respective code statements of the first computer program code with respective contexts that each represents at least one identified parser state that is associated by the third information structure with one or more obligations.

9. The method of claim 1,
wherein the first computer program code configures the computer to operate as a web server.

10. The method of claim 1,
wherein the second computer program code configures the same or a different computer to operate as a browser.

11. The method of claim 1,
wherein the produced code includes HTML code.

12. The method of claim 1,
wherein the produced code includes one or more of code in the HTML, CSS and JavaScript languages.

13. The method of claim 1,
wherein the first computer program code configures the computer to operate as a web server;
wherein the second computer program code configures the same or a different computer to operate as a browser; and
wherein the produced code includes code that is consumed by the browser.

14. The method of claim 1,
wherein the first computer program code configures the computer to operate as a web server;
wherein the second computer program code configures the same or a different computer to operate as a browser; and
wherein the produced code includes code used by the browser to generate a user interface screen display.

15. The method of claim 1,
wherein the identified technology used by the first computer program code to produce the respective code statement includes a domain specific language.

16. The method of claim 1,
wherein the identified technology used by the first computer program code to produce the respective code statement includes an application programming interface.

17. The method of claim 1,
wherein the identified technology used by the first computer program code to produce the respective code statement includes at least one of JAVA, JSP, EL, Hibernate and Hibernate query Language.

18. The method of claim 1,
wherein the at least one context includes at least one of JS String, SQL string, SQL keyword, HTML attribute, CSS string, and URI.

19. The method of claim 1 further including:
providing in a computer readable storage device a code fix for the determined remediation.

20. The method of claim 1 further including:
providing in a computer readable storage device one or more templates to indicate a code fix for the determined remediation.

21. The method of claim 1 further including:
providing in a non-transitory computer readable storage device, a third information structure that associates at least one parser state with one or more obligations;
wherein producing the second information structure in a non-transitory computer readable storage device that associates a respective code statement of the first computer program code with at least one context that corresponds to at least one identified parser state that is associated by the third information structure with one or more obligations.

22. The method of claim 1,
wherein identifying a technology used by the first computer program code to represent the respective code statement includes configuring a computer to run a static analysis that includes running a checker to identify a technology used by the first computer program code to represent the respective code statement.

23. An article of manufacture that includes a non-transitory computer readable storage device that includes first computer program code to configure a first computer to perform a process to produce code in response to a request from a different computer configured using second computer program code, to use the produced code to parse one or more contexts within the produced code, each context corresponding to one or more parser states and to generate output information, the process including:
configuring a computer to perform static analysis of the first computer program code that includes,
simulating the first computer configured, to produce, in a non-transitory computer readable storage device, at least a portion of the produced code that includes one or more contexts;
simulating the different computer configured, to identify one or more parser states that correspond to the one or more contexts in the at least a portion of the produced code;
producing a first information structure in a non-transitory computer readable storage device that associates a respective code statement of the first computer program code with at least one context that corresponds to at least one identified parser state; and
configuring a computer to perform a static analysis of the first computer program code that includes,
running multiple checkers to identify one or more defect types in the first computer program code;
producing a second information structure in a non-transitory computer readable storage device that associates the respective code statement of the first computer program code with the one or more identified defect types;
identifying a technology used by the first computer program code to represent the respective code statement; and
determining a remediation for an identified defect type that is associated by the second information structure with the respective code statement, based upon at least, the at least one context that is associated by the first information structure with the respective code statement, and the identified technology.

24. A method to remediate a defect in first computer program code used to configure a web server to produce code for use by a browser, in response to a request from the browser, the method comprising:
configuring a computer to perform static analysis to simulate the web server to produce at least a portion of the produced code, the produced code having one or more contexts, and to simulate the browser identifying one or more parser states that correspond to the one or more contexts in the at least a portion of the produced code and to associate a code statement of the first computer program code with at least one context that corresponds to at least one identified parser state;
configuring a computer to perform static analysis that includes running multiple checkers to identify one or more defect types in the first computer program code and to associate the code statement with at least one identified defect type;
identifying a technology used by the first computer program code to represent the code statement; and
selecting a remediation for the at least one identified defect types based upon the at least one context and the defect type associated with the code statement and upon the identified technology used to represent the code statement.

25. A system for use to remediate a defect in first computer program code used to configure a web server to produce code for use by a browser, in response to a request from the browser, the system comprising:
   a computer configured to,
   perform static analysis to simulate the web server to produce at least a portion of the produced code, the produced code having one or more contexts, and to simulate the browser identifying one or more parser states that correspond to the one or more contexts in the at least a portion of the produced code and to associate a code statement of the first computer program code with at least one context that corresponds to at least one identified parser state;
   perform static analysis that includes running multiple checkers to identify one or more defect types in the first computer program code and to associate the code statement with at least one identified defect type;
   identify a technology used by the first computer program code to represent the code statement; and
   select a remediation for the at least one identified defect types based upon the at least one context and the defect type associated with the code statement and upon the identified technology used to represent the code statement.

* * * * *